US012562415B1

(12) United States Patent
Hayashi et al.

(10) Patent No.: US 12,562,415 B1
(45) Date of Patent: Feb. 24, 2026

(54) THERMAL INSULATION SHEET BETWEEN BATTERY CELLS FOR ELECTRIC AUTOMOBILE

(71) Applicant: Sumitomo Riko Company Limited, Aichi (JP)

(72) Inventors: Shota Hayashi, Aichi (JP); Sota Takebe, Aichi (JP); Naoki Katayama, Aichi (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days.

(21) Appl. No.: 19/211,647

(22) Filed: May 19, 2025

Related U.S. Application Data

(60) Provisional application No. 63/713,142, filed on Oct. 29, 2024.

(30) Foreign Application Priority Data

| Oct. 31, 2024 | (JP) | ................................. | 2024-191884 |
| Apr. 21, 2025 | (JP) | ................................. | 2025-069515 |

(51) Int. Cl.
| *H01M 10/658* | (2014.01) |
| *H01M 10/625* | (2014.01) |
| *H01M 10/65* | (2014.01) |

(52) U.S. Cl.
CPC ....... *H01M 10/658* (2015.04); *H01M 10/625* (2015.04); *H01M 2220/20* (2013.01)

(58) Field of Classification Search
CPC ............................. H01M 10/658; H01M 10/65
See application file for complete search history.

(56) References Cited

U.S. PATENT DOCUMENTS

| 2014/0329922 A1* | 11/2014 | Yang | ..................... | C04B 38/103 |
| | | | | 521/146 |
| 2018/0043656 A1* | 2/2018 | Song | ................... | H01M 50/491 |
| 2018/0156550 A1 | 6/2018 | Oikawa et al. | | |
| 2019/0161909 A1 | 5/2019 | Oikawa et al. | | |
| 2019/0209955 A1* | 7/2019 | Adlhart | .............. | B01D 39/1615 |
| 2021/0180244 A1 | 6/2021 | Oikawa et al. | | |
| 2021/0363699 A1* | 11/2021 | Afshari | .................. | D21H 21/52 |
| 2022/0089503 A1* | 3/2022 | Ren | ........................ | C04B 41/009 |
| 2022/0090313 A1 | 3/2022 | Hanashiro et al. | | |
| 2022/0181716 A1* | 6/2022 | Katayama | ......... | H01M 10/0525 |

(Continued)

FOREIGN PATENT DOCUMENTS

| CN | 112151918 A | 12/2020 |
| CN | 113651592 A | 11/2021 |

(Continued)

OTHER PUBLICATIONS

Notice of reasons for refusal mailed on Jan. 7, 2025, received for JP Application 2024-191884, 8 pages including English Translation.

(Continued)

*Primary Examiner* — Yoshitoshi Takeuchi
(74) *Attorney, Agent, or Firm* — XSENSUS LLP

(57) ABSTRACT

A thermal insulation sheet between battery cells for an electric automobile includes silica aerogel and a fiber, and has a plurality of holes on one surface and another surface in a thickness direction. A ratio of the number of holes on the one surface to the number of holes on the other surface is preferably 1.3 or more.

15 Claims, 1 Drawing Sheet

(56) References Cited

U.S. PATENT DOCUMENTS

| | | | |
|---|---|---|---|
| 2022/0247040 A1* | 8/2022 | Kogami ................ | H01M 50/44 |
| 2023/0061063 A1* | 3/2023 | Ren ......................... | C04B 41/89 |
| 2023/0302764 A1* | 9/2023 | Taguchi .................. | F16L 59/08 |
| 2024/0250334 A1 | 7/2024 | Imae et al. | |
| 2024/0339698 A1* | 10/2024 | Shimada ........... | H01M 10/6551 |
| 2024/0400464 A1* | 12/2024 | Kawakami .............. | F16L 59/04 |
| 2025/0183418 A1* | 6/2025 | Kumano ............. | H01M 10/613 |
| 2025/0253465 A1* | 8/2025 | Williams .......... | H01M 10/6561 |

FOREIGN PATENT DOCUMENTS

| | | | |
|---|---|---|---|
| CN | 114883736 A | 8/2022 | |
| CN | 117691260 A | 3/2024 | |
| EP | 4464810 A1 | 11/2024 | |
| EP | 4492540 A1 | 1/2025 | |
| JP | 2017-215014 A | 12/2017 | |
| JP | 2018-091480 A | 6/2018 | |
| JP | 2019-099984 A | 6/2019 | |
| JP | 2023-035097 A | 3/2023 | |
| JP | 2023-518231 A | 4/2023 | |
| JP | 2023-132944 A | 9/2023 | |
| JP | 7364742 B1 | 10/2023 | |
| JP | 7474821 B1 | 4/2024 | |
| JP | 2024-097328 A | 7/2024 | |
| WO | 2020/188867 A1 | 9/2020 | |
| WO | 2020/261729 A1 | 12/2020 | |
| WO | 2023/100141 A1 | 6/2023 | |
| WO | 2023/145883 A1 | 8/2023 | |
| WO | 2024/107322 A1 | 5/2024 | |

OTHER PUBLICATIONS

Decision to Grant a Patent mailed on Mar. 18, 2025, received for JP Application 2025-024945, 3 pages including English Translation.

* cited by examiner

THERMAL INSULATION SHEET BETWEEN BATTERY CELLS FOR ELECTRIC AUTOMOBILE

This specification claims the benefit of the earlier filing date of U.S. Provisional Application No. 63/713,142, filed on Oct. 29, 2024, and also claims priority to Japanese Patent Application No. 2024-191884, filed on Oct. 31, 2024, and Japanese Patent Application No. 2025-69515, filed on Apr. 21, 2025, all of which are incorporated by reference in their entireties.

BACKGROUND

1. Field of the Disclosure

The present disclosure relates to a thermal insulation sheet between battery cells for an electric automobile.

2. Description of the Related Art

A silica aerogel is composed of multiple silica particles linked together to form a backbone, in which there are pores that are smaller than a mean free path of air. This fine porous structure offers a low thermal conductivity, thereby making it useful as a composition material for a thermal insulation material in an in-vehicle part, a residential construction material, industrial equipment, and the like.

There are many cases that the surface mechanical strength of the thermal insulation material containing silica aerogel is low, thereby causing a powder fall-off upon receiving an impact, which is blamed to be problematic. For example, when this is used as a thermal insulation material for an automobile battery, the expansion caused by the heat of the battery generates a pressure, resulting in the powder fall-off, which may lower the performance of an electronic device. As means to solve this problem, it is described, for example, in Japanese Patent Application Laid-open Nos. 2024-97328 and 2023-132944, that the occurrence of the powder fall-off may be suppressed by, among other things, blending a mineral fiber and a hot melt powder on a silica aerogel-containing sheet and sealing the surface thereof by a film. In addition, in Japanese Patent Application Laid-open No. 2023-35097, it is described that the powder fall-off may be suppressed by forming a thermal insulation elastic member including an elastic layer on one surface of a silica aerogel sheet and a cover layer on the other surface thereof, or by covering the sheet and an entire body with an outer package.

SUMMARY

Among the above-mentioned conventional technologies, as recognized by the present inventor, the technology of forming a film does not intend to suppress the fall-off of the aerogel (hereinafter, this is referred to as "powder fall-off") which is caused by detachment of the silica aerogel that is physically and chemically bonded to the fiber, this bonding being effected by the stress applied to the silica aerogel sheet. According to the technology of Japanese Patent Application Laid-open No. 2023-132944, the cured layer formed by the hot melt powder may reduce the thermal insulation performance of the sheet.

Among the sheet surfaces, a sheet surface that receives a stress caused by battery expansion and also a sheet surface that is close to a vibration source are prone to cause the powder fall-off due to a stress and transmission of the vibration. When the powder fall-off of the aerogel occurs, the aerogel present inside the thermal insulation sheet may vary in its concentration, which may result in insufficient expression of the thermal insulation performance depending on the location thereof.

The embodiments provide a silica aerogel-containing thermal insulation sheet between battery cells for an electric automobile, which cannot cause the powder fall-off.

The present disclosure provides at least the following [1] to attributes.

[1]. A thermal insulation sheet between battery cells for an electric automobile, the thermal insulation sheet comprising:

silica aerogel; and a fiber the thermal insulation sheet has a plurality of holes on one surface and another surface in a thickness direction, and a ratio of the number of holes on the one surface to the number of holes on the other surface is 1.3 or more.

[2] The sheet according to [1], wherein the number of holes on the one surface is in a range of 25,000 to 225,000 holes/m².

[3] The sheet according to [1] or [2], wherein the number of holes on the other surface is in a range of 10,000 to 50,000 holes/m².

[4] The sheet according to any one of [1] to [3], wherein a difference between a surface roughness of the one surface and a surface roughness Sa of the other surface is 10 μm or more.

[5] The sheet according to any one of [1] to [4], wherein a difference between a surface roughness of the one surface and a surface roughness Sa of the other surface is 30 μm or more.

[6] The sheet according to any one of [1] to [5], wherein the surface roughness Sa of the one surface is 60 μm or more.

[7] The sheet according to any one of [1] to [6], wherein the surface roughness Sa of the one surface is in a range of 80 to 250 μm.

[8] The sheet according to any one of [1] to [7], wherein the surface roughness Sa of the other surface is 180 μm or less.

[9] The sheet according to any one of [1] to [8], wherein the surface roughness Sa of the other surface is in a range of 30 to 180 μm.

[10] The sheet according to any one of [1] to [9], further comprising a film that covers at least part of the one surface and the other surface.

[11] The sheet according to any one of [1] to [9], further comprising an elastic body layer that is laminated to at least part of the one surface and the other surface.

[12] The sheet according to any one of [1] to [9], further comprising a film that covers the one surface and the other surface and an elastic body layer that is laminated to the one surface or to the other surface via a film.

[13] A thermal insulation sheet between battery cells for an electric automobile, the thermal insulation sheet comprising:

silica aerogel; and a fiber the thermal insulation sheet has a plurality of irregularities on one surface and another surface in a thickness direction, and a ratio of the surface roughness Sa of the one surface to the surface roughness Sa of the other surface is 1.3 or more.

[14] The sheet according to [1], wherein:
the number of holes on the one surface is in a range of 100,000 to 150,000 holes/m$^2$,
the surface roughness Sa of the one surface is in a range of 80 to 100 µm
the number of holes on the other surface is in a range of 20,000 to 30,000 holes/m$^2$, and
the surface roughness Sa of the other surface is in a range of 30 to 50 µm.

[15] The sheet according to [13], wherein:
a ratio of the number of holes on the one surface to the number of holes on the other surface is in a range of 2.3 to 4.4, and
a difference between a surface roughness of the one surface and a surface roughness Sa of the other surface is in a range of 30 to 100 µm.

DETAILED DESCRIPTION OF THE PREFERRED EMBODIMENTS

Figure 1:
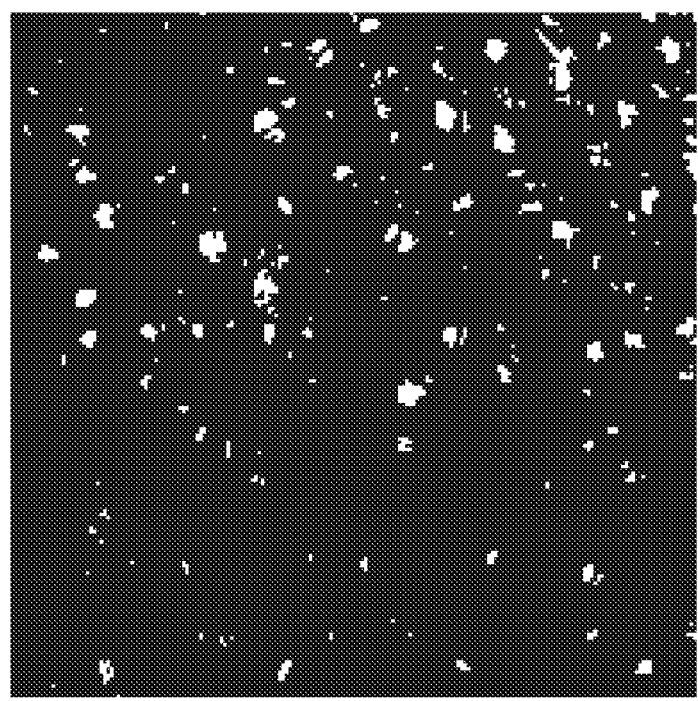
FIG. 1 is an example of an image when one surface (surface A) in a sheet according to one aspect of the present disclosure is binarized.

Next, embodiments will be described in detail.

In this specification, when "X to Y" (X and Y are arbitrary numbers) is described, unless otherwise specifically noted, this means "more than or equal to X and less than or equal to Y" and also "preferably more than X" or "preferably less than Y".

In this specification, for numerical ranges described in steps, the upper or lower limit of the numerical range for one step may be arbitrarily combined with the upper or lower limit of the numerical range for another step, unless otherwise specifically noted. In the numerical ranges described in this specification, the upper or lower limits of the numerical range may be replaced by the values described in Examples.

In this specification, "X and/or Y (X and Y are arbitrary configurations)" means at least one of X and Y, unless otherwise specifically noted, and this means X only, Y only, or X and Y, in the three ways.

1. Material of Thermal Insulation Sheet

The thermal insulation sheet is the sheet having silica aerogel and a fiber.

1.1 Silica Aerogel

In this specification, the silica aerogel is a structure formed of silica particles as primary particles, which are aggregated to form a secondary particle, and a backbone consisting mainly of these particles and having pores between them.

—Average Particle Size of Primary Particles—

The average particle size of the silica particle (primary particle) that forms the backbone of the silica aerogel is usually in the range of about 2 to about 5 nm.

The average particle diameter of the silica particle may be measured by observation with an electron microscope.

—Pore Size—

Usually, the pores that the silica aerogel has are mostly mesopores. The diameter of the mesopore is 50 nm or less, thus it is less than the mean free path of air. Therefore, air convection is restricted and heat transfer is inhibited, thereby allowing a thermal insulation performance to be expressed. The lower limit may be 10 nm or more.

The is no particular restriction in the shape of the silica aerogel; thus, it may be spherical, lamp of irregular particles, among others. For example, in the case of a spherical shape, the closest packing may be easy, thereby allowing the blending amount of the particles to be increased, resulting in enhancement of the thermal insulation performance.

—Average Particle Size of Secondary Particle—

The average particle size of the particles (mainly secondary particles) that constitute the silica aerogel is usually 1 µm or more, preferably 10 µm or more. The larger the particle size, the smaller the surface area with the increasing pore volume, which results in enhancement of the improving effect of the thermal insulation performance. The upper limit of the particle diameter may be 200 µm or less, for example. The average particle size of the secondary particles is the median diameter (D50) obtained from the volume-based particle size distribution measured by a laser diffraction and scattering method.

The thermal insulation sheet may contain one type of the silica aerogel, or two or more different types of the silica aerogels; it is preferable to contain two or more types of the silica aerogels having different particle sizes with each other. This allows the smaller diameter silica aerogels to enter the gaps between the larger diameter silica aerogels, thereby increasing the filling volume, which results in further improvement in the thermal insulation performance.

The silica aerogel may be formed by impregnating a fiber with a coating solution (including slurry) containing a binder and other components, these to be described later, which may be then followed by drying. Alternatively, the silica aerogel may also be formed by impregnating the fiber with the silica aerogel in its precursor sol state, which may be then heated or otherwise to be gelatinized, and then followed by drying.

The silica aerogel that is synthesized as appropriate may be used, or commercially available products may also be used.

1.2 Fiber (Reinforcing Fiber)

Illustrative examples of the fiber include: inorganic fibers such as a glass fiber, a ceramic fiber, a quartz fiber, an alumina fiber, a silica fiber, a silicon carbide fiber, a boron fiber, and a metal fiber (for example, aluminum and iron); organic fibers such as a polyamide fiber, a polyimide fiber, an aromatic polyamide fiber (an aramid fiber), a polyolefin fiber (for example, a polyethylene fiber and a polypropylene fiber), a fluorine-based fiber (for example, a polytetrafluoroethylene fiber), an acrylic fiber, a polyparaphenylene benzobisoxazole (PBO) fiber, a polyarylate fiber, a polyurethane fiber, a polyether ether ketone (PEEK) fiber, a polyether sulfone (PES) fiber, a polyether imide (PEI) fiber, a polyether ketone (PEK) fiber, and a polyphenylene sulfide (PPS) fiber. Natural fibers such as a wood fiber, a silk, a hemp, and a wool fiber may also be used. Among these, fibers having strength and/or heat resistance are preferable, inorganic fibers are more preferable, and a glass fiber is still more preferable. The fibers are any of a non-continuous fiber, a bundle of multiple fibers, and fabrics such as nonwoven and woven fabrics, or a combination of these. It is preferable that the fiber included in the thermal insulation sheet includes a fabric, more preferably a nonwoven fabric. This may enhance the mechanical strength furthermore. By using a perforated or a fluffed cloth (preferably a nonwoven fabric, more preferably a glass nonwoven fabric) as the fiber, the hole ratio and surface roughness of the sheet surface may be easily controlled.

1.3 Optional Component

The thermal insulation material may contain optional components other than the silica aerogel and the fiber. Examples of the optional component include a binder and a thickener.

—Binder—

The addition of a binder may contribute to reduction of degradation in a high temperature atmosphere and to suppression of cracking. The binder may be any of an inorganic material and an organic material.

Illustrative examples of the inorganic material include talc, carbon black, kaolinite, montmorillonite, mica, silica (for example, precipitated silica, gel-method silica, and fused silica), wollastonite, magnesium silicate, titania, metal carbonate (for example, silicon carbonate, titanium carbonate, or tungsten carbonate), metal oxides (for example, manganese oxide, nickel oxide, tin oxide, silver oxide, bismuth trioxide, chromium oxide, iron oxide, alumina, zirconia, and manganese dioxide), metal nitride (for example, silicon nitride and aluminum nitride), ilmenite, zirconium silicate, potassium titanate, glass flake, water glass (sodium silicate), calcium carbonate, barium sulfate, hydraulic material (for example, cement, gypsum, and magnesium silicate), quicklime, slaked lime, and combinations of these materials. Among these materials, an appropriate material may be selected. For example, silica is preferable because it is compatible with the silica aerogel and is inexpensive and readily available. The hydraulic material is converted to a binder while reacting with water, the solvent normally used in the production of the silica aerogel, and while filling the gaps between the silica particles to form a high-strength insulation layer. In addition, because of its low cost and easy availability, the hydraulic material is preferable. Also, a material having a large specific surface area and hardness may also be selected.

The organic material is preferably a water-based binder (a binder that is soluble or dispersible in water (i.e., emulsion-formable)); this may be a substance that imparts the silica aerogel with a hydrophilic group, or what is called a surfactant as well.

The glass transition temperature (Tg) of the organic material is preferably −5° C. or lower, more preferably −20° C. or lower. This may enhance not only the adhesiveness to the silica aerogel, but also the sheet's flexibility, resulting in suppression of cracking.

Illustrative examples of the organic binder include: resins such as an acrylic resin, a urethane resin, and a mixture of acrylic and urethane resins; and rubbers such as a styrene butadiene rubber (SBR), a nitrile rubber, a silicone rubber, a urethane rubber, and an acrylic rubber. Among these, a urethane resin and SBR are preferable. This can enhance the flexibility of the sheet, thereby realizing a flexible sheet. When using a binder, this may also be used in combination with a crosslinking agent. This causes the binder to cross-link, which further enhances the strength of the sheet.

—Thickener—

The use of a thickener may enhance the dispersibility of the silica aerogels in a solvent (usually water), resulting in enhancement of the processability thereof. This is also possible to provide the sheet with flexibility, thereby suppressing cracking. Illustrative examples of the thickener include carboxymethyl cellulose (CMC), polyethylene oxide (PEO), carboxyethyl cellulose, carboxypropyl cellulose, hydroxyethyl cellulose, hydroxypropyl cellulose, xanthan gum, agarose, carrageenan, polysaccharides such as glucomannan, and polyvinyl alcohol.

—Flame Retardant—

The use of a flame retardant causes the flame retardancy of the sheet to be enhanced. Illustrative examples of the flame retardant include a halogen type, a phosphorus type, and a metal hydroxide type, in which phosphorus-type flame retardants (for example, ammonium polyphosphate, red phosphorus, and a phosphate esters) are preferable; water-insoluble phosphorus flame retardants are more preferable, and ammonium polyphosphate is still more preferable.

For example, one, or two or more types of materials selected from a preservative, a colorant, an infrared beam shielding particle, and a radiation beam absorbing/reflecting material may be used.

1.4 Composition

—Content of Silica Aerogel—

The content of the silica aerogel in the thermal insulation sheet is usually 10% by mass or more, preferably 20% by mass or more, or more preferably 308 by mass or more, relative to 100% by mass of the total mass of the thermal insulation sheet. This makes it possible to enhance the thermal insulating effect. The upper limit thereof is usually 80% by mass or less, preferably 60% by mass or less, and more preferably 40% by mass or less. This suppresses a decrease in the mechanical strength, and also what is called powder fall-off.

—Fiber Content—

The fiber content in the thermal insulation sheet is usually 20% by mass or more, preferably 308 by mass or more, relative to 100% by mass of the total mass of the thermal insulation sheet. This makes it possible to enhance the mechanical strength. The upper limit thereof is usually 70% by mass or less, preferably 60% by mass or less. This allows the mechanical strength commensurate with the content thereof to be expressed.

2. Thermal Insulation Sheet

It is preferable that the thermal insulation sheet is composed of the above-mentioned materials and satisfies one or more of the following shapes and physical properties.

2.1 Sheet Thickness

The thermal insulation sheet is usually a flat-plate type. The thickness of the sheet is not particularly restricted. This may be, for example, 10 mm or less, 8 mm or less, 3 mm or less, 2.5 mm or less, or 2 mm or less. When the thickness is in an appropriate range, the strength of the sheet may be maintained. The lower limit thereof is usually 0.1 mm or more, and preferably 0.5 mm or more, or 1 mm or more. It is preferable that the thickness is almost even; the thickness variation may be, for example, 5% or less, 4% or less, or even 3% or less.

2.2 Surface Shape

The thermal insulation sheet has irregularities, holes (openings), and the like, on its surface (both the one surface and the other surface, viewed from a horizontal direction). The hole usually has multiple openings and may be present randomly. The shape of the hole is not particularly restricted; and it may be circular, polygonal, or irregular. The irregularity is usually not constant, existing unevenly in some cases.

The properties of the sheet surface differ on the two surfaces of the sheet, i.e., the one surface and the other surface viewed from the thickness direction of the sheet. With this, for example, in the one surface where the number (distribution) of the hole is relatively large or the surface roughness is relatively large (hereinafter, this surface is referred to as Surface A), even if the silica aerogel physically and chemically bonded to the fiber is detached when a stress, a vibration, or other force is applied to the sheet, because the number (distribution) of the hole is large or the surface roughness is relatively large, it is easier to capture the detached silica aerogel, thereby suppressing the downward powder fall-off. In addition, because the Surface A has a predetermined shape and/or they are formed by the fiber, the adhesiveness with a film or the like may be enhanced; and thus, when a stress, a vibration, or other force is applied to the silica aerogel sheet, the detachment of the silica aerogel from the film or the like may be suppressed, resulting in suppression of the downward powder fall-off.

On the other hand, on the other surface (hereinafter, this surface is referred to as Surface B) where the number (distribution) of the hole is relatively small or the surface roughness is relatively small, a stress, a vibration, or other force applied to the silica aerogel sheet is small, so that the silica aerogel physically and chemically bonded to the fiber is difficult to be detached; because of this, it is possible to reduce the number (distribution) of the hole, which itself is the cause of the powder fall-off, or to decrease the surface roughness.

As explained above, the different properties in the sheet surfaces allow the occurrence of the powder fall-off from the sheet to be suppressed as a whole, thereby suppressing the decrease in the thermal insulation performance.

—Number of Holes—

The number of holes is different between the Surfaces A and B to each other. The ratio of the number of holes on the Surface A to the number of holes on the Surface B is preferably 1.3 or more, 1.4 or more, 1.5 or more, 1.6 or more, 1.7 or more, 1.8 or more, 1.9 or more, 2.0 or more, or 2.1 or more; more preferably 2.2 or more, 2.3 or more, 2.4 or more, 2.5 or more, or 2.6 or more; and still more preferably 2.7 or more, 2.8 or more, 2.9 or more, 3.0 or more, 3.1 or more, 3.2 or more, 3.3 or more, 3.4 or more, 3.5 or more, 3.6 or more, 3.7 or more, 3.8 or more, 3.9 or more, or 4.0 or more. The upper limit thereof is preferably 9.0 or less, 8.9 or less, 8.8 or less, 8.7 or less, 8.6 or less, 8.5 or less, 8.4 or less, 8.3 or less, 8.2 or less, or 8.1 or less; more preferably 8.0 or less, 7.9 or less, 7.8 or less, 7.7 or less, 7.6 or less, 7.5 or less, 7.4 or less, 7.3 or less, 7.2 or less, or 7.1 or less; and still more preferably 7.0 or less. Thus, the range of the ratio is preferably 1.3 or more, more preferably 1.3 to 9.0, 1.3 to 8.9, 1.3 to 8.8, 1.3 to 8.7, 1.3 to 8.6, 1.3 to 8.5, 1.3 to 8.4, 1.3 to 8.3, 1.3 to 8.2, 1.3 to 8.1, 1.3 to 8.0, 1.3 to 7.9, 1.3 to 7.8, 1.3 to 7.7, 1.3 to 7.6, 1.3 to 7.5, 1.3 to 7.4, 1.3 to 7.3, 1.3 to 7.2, 1.3 to 7.1, 1.3 to 7.0, 1.4 to 7.0, 1.5 to 7.0, 1.6 to 7.0, 1.7 to 7.0, 1.8 to 7.0, 1.9 to 7.0, 2.0 to 9.0, 2.0 to 8.9, 2.0 to 8.8, 2.0 to 8.7, 2.0 to 8.6, 2.0 to 8.5, 2.0 to 8.4, 2.0 to 8.3, 2.0 to 8.2, 2.0 to 8.1, 2.0 to 8.0, 2.0 to 7.9, 2.0 to 7.8, 2.0 to 7.7, 2.0 to 7.6, 2.0 to 7.5, 2.0 to 7.4, 2.0 to 7.3, 2.0 to 7.2, 2.0 to 7.1, 2.0 to 7.0, 2.1 to 7.0, 2.2 to 9.0, 2.2 to 8.9, 2.2 to 8.8, 2.2 to 8.7, 2.2 to 8.6, 2.2 to 8.5, 2.2 to 8.4, 2.2 to 8.3, 2.2 to 8.2, 2.2 to 8.1, 2.2 to 8.0, 2.2 to 7.9, 2.2 to 7.8, 2.2 to 7.7, 2.2 to 7.6, 2.2 to 7.5, 2.2 to 7.4, 2.2 to 7.3, 2.2 to 7.2, 2.2 to 7.1, 2.2 to 7.0, 2.7 to 9.0, 2.7 to 8.9, 2.7 to 8.8, 2.7 to 8.7, 2.7 to 8.6, 2.7 to 8.5, 2.7 to 8.4, 2.7 to 8.3, 2.7 to 8.2, 2.7 to 8.1, 2.7 to 8.0, 2.7 to 7.9, 2.7 to 7.8, 2.7 to 7.7, 2.7 to 7.6, 2.7 to 7.5, 2.7 to 7.4, 2.7 to 7.3, 2.7 to 7.2, 2.7 to 7.1, 2.7 to 7.0, 2.8 to 7.0, 2.9 to 7.0, 3.0 to 7.0, 3.1 to 7.0, 3.2 to 7.0, 3.3 to 7.0, 3.4 to 7.0, 3.5 to 7.0, 3.6 to 7.0, 3.7 to 7.0, 3.8 to 7.0, 3.9 to 7.0, 4.0 to 9.0, 4.0 to 8.9, 4.0 to 8.8, 4.0 to 8.7, 4.0 to 8.6, 4.0 to 8.5, 4.0 to 8.4, 4.0 to 8.3, 4.0 to 8.2, 4.0 to 8.1, 4.0 to 8.0, 4.0 to 7.9, 4.0 to 7.8, 4.0 to 7.7, 4.0 to 7.6, 4.0 to 7.5, 4.0 to 7.4, 4.0 to 7.3, 4.0 to 7.2, 4.0 to 7.1, or 4.0 to 7.0. This allows, on the Surface B, the powder fall-off to be prevented from occurring, thereby providing a better thermal insulation performance, and on the Surface A, the powder fall-off to be prevented from occurring and the adhesiveness to be enhanced, thereby providing a better thermal insulation performance.

The number of holes on the surface A is preferably 25,000 holes/$m^2$ or more, 26,000 holes/$m^2$ or more, 27,000 holes/$m^2$ or more, 28,000 holes/$m^2$ or more, 29,000 holes/$m^2$ or more, 30,000 holes/$m^2$ or more, 31,000 holes/$m^2$ or more, 32,000 holes/$m^2$ or more, 33,000 holes/$m^2$ or more, or 34,000 holes/$m^2$ or more; more preferably 35,000 holes/$m^2$ or more, 36,000 holes/$m^2$ or more, 37,000 holes/$m^2$ or more, 38,000 holes/$m^2$ or more, 39,000 holes/$m^2$ or more, 40,000 holes/$m^2$ or more, 41,000 holes/$m^2$ or more, 42,000 holes/$m^2$ or more, 43,000 holes/$m^2$ or more, or 44,000 holes/$m^2$ or more, 45,000 holes/$m^2$ or more, 46,000 holes/$m^2$ or more, 47,000 holes/$m^2$ or more, 48,000 holes/$m^2$ or more, or 49,000 holes/$m^2$ or more; and still more preferably 50,000 holes/$m^2$ or more. This allows the powders that fall off from the sheet surface to be captured, and thereby suppressing the powder fall-off. The upper limit thereof is preferably 225,000 holes/$m^2$ or less, 220,000 holes/$m^2$ or less, 215,000 holes/$m^2$ or less, 210,000 holes/$m^2$ or less, or 205,000 holes/$m^2$ or less; more preferably 200,000 holes/$m^2$ or less, 195,000 holes/$m^2$ or less, 190,000 holes/$m^2$ or less, 185,000 holes/$m^2$ or less, 180,000 holes/$m^2$ or less, 175,000 holes/$m^2$ or less, 170,000 holes/$m^2$ or less, 165,000 holes/$m^2$ or less, 160,000 holes/$m^2$ or less, or 155,000 holes/$m^2$ or less; and still more preferably 150,000 holes/$m^2$ or less. This prevents the holes themselves from falling off from the sheet surface, and thereby suppressing the powder fall-off. Therefore, the number of holes is preferably in the range of 25,000 to 225,000 holes/$m^2$, 26,000 to 220,000 holes/$m^2$, 27,000 to 220,000 holes/$m^2$, 28,000 to 220,000 holes/$m^2$, 29,000 to 215,000 holes/$m^2$, 30,000 to 215,000 holes/$m^2$, 31,000 to 215,000 holes/$m^2$, 32,000 to 210,000 holes/$m^2$, 33,000 to 210,000 holes/$m^2$, or 34,000 to 205,000 holes/$m^2$; more preferably in the range of 35,000 to 200,000 holes/$m^2$, 36,000 to 195,000 holes/$m^2$, 37,000 to 195,000 holes/$m^2$, 38,000 to 195,000 holes/$m^2$, 39,000 to 190,000 holes/$m^2$, 40,000 to 190,000 holes/$m^2$, 41,000 to 185,000 holes/$m^2$, 42,000 to 185,000 holes/$m^2$, 43,000 to 170,000 holes/$m^2$, 44,000 to 170,000 holes/$m^2$, 45,000 to 165,000 holes/$m^2$, 46,000 to 165,000 holes/$m^2$, 47,000 to 160,000 holes/$m^2$, 48,000 to 160,000 holes/$m^2$, or 49,000 to 155,000 holes/$m^2$; and still more preferably in the range of 50,000 to 150,000 holes/$m^2$.

The number of holes on the Surface B is preferably 10,000 holes/$m^2$ or more, 11,000 holes/$m^2$ or more, 12,000 holes/$m^2$ or more, 13,000 holes/$m^2$ or more, 14,000 holes/$m^2$ or more, 15,000 holes/$m^2$ or more, 16,000 holes/$m^2$ or more, 17,000 holes/$m^2$ or more, 18,000 holes/$m^2$ or more, or 19,000 holes/$m^2$ or more; and more preferably 20,000 holes/$m^2$ or more. This allows the powders that fall off from the sheet surface to be captured, and thereby suppressing the powder fall-off. The upper limit thereof is preferably 50,000 holes/$m^2$ or less, 49,000 holes/$m^2$ or less, 48,000 holes/$m^2$ or less, 47,000 holes/$m^2$ or less, 46,000 holes/$m^2$ or less, 45,000 holes/$m^2$ or less, 44,000 holes/$m^2$ or less, 43,000 holes/$m^2$ or less, 42,000 holes/$m^2$ or less, 41,000 holes/$m^2$ or less, 40,000 holes/$m^2$ or less, 39,000 holes/$m^2$ or less, 38,000 holes/$m^2$ or less, 37,000 holes/$m^2$ or less, 36,000 holes/$m^2$ or less, 35,000 holes/$m^2$ or less, 34,000 holes/$m^2$ or less, 33,000 holes/$m^2$ or less, 32,000 holes/$m^2$ or less, or 31,000 holes/$m^2$ or less; and more preferably 30,000 holes/$m^2$ or less. This prevents the holes themselves from falling off from the sheet surface, and thereby suppressing the powder fall-off. Therefore, the number of holes is preferably in the range of 10,000 to 50,000 holes/$m^2$, 10,000 to 49,000 holes/$m^2$, 10,000 to 48,000 holes/$m^2$, 11,000 to 47,000 holes/$m^2$, 11,000 to 46,000 holes/m², 12,000 to 45,000 holes/m², 12,000 to 44,000 holes/m², 13,000 to 43,000 holes/m², 13,000 to 42,000 holes/m², 14,000 to 41,000 holes/m², 14,000 to 40,000 holes/m², 15,000 to 39,000 holes/m², 15,000 to 38,000 holes/m², 16,000 to 37,000 holes/m², 16,000 to 36,000 holes/m², 17,000 to 35,000 holes/m², 17,000 to 34,000 holes/m², 18,000 to 33,000 holes/m², 18,000 to 32,000 holes/m², or 19,000 to 31,000 holes/m²; and more preferably in the range of 20,000 to 30,000 holes/m².

Figure 2:
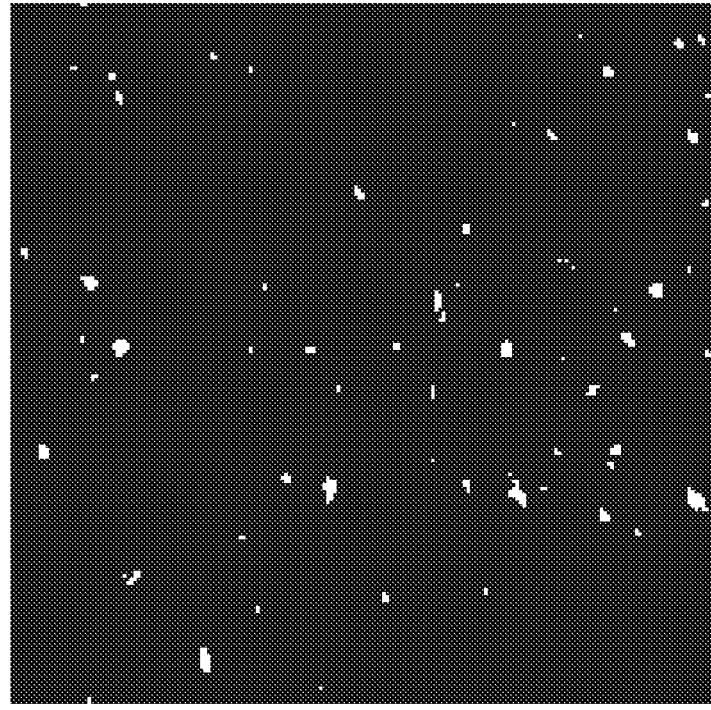
FIG. 2 is an example of an image when other surface (surface B) in the sheet according to one aspect of the present disclosure is binarized.

The number of holes may be calculated by the method described below. The sheet is cut into a piece with a size of 15 cm×15 cm, and the resulting sheet piece is photographed by a digital camera (for example, PowerShot SX720 HS, manufactured by Canon Inc.) at five arbitrary locations. The photographed image is cut out to obtain a 2 cm×2 cm image (200 pixels×200 pixels) using image processing software (for example, ImageJ), and using the ImageJ's binarization function, the area with a luminance of 125 or less is binarized as the holes (examples of binarization of the Surfaces A and B are indicated in FIG. 1 and FIG. 2, respectively). Next, using the ImageJ's particle analysis function, particles with 4 pixels^2 or less are removed as noise, and the number of holes is counted. The average value of the five locations is calculated; and then, this is used as the number of holes.

The hole may be covered with glass fibers or the like, or it may include the hole that penetrates from the surface to the back surface. The diameter of the hole counted under the above conditions is the hole greater than or equal to 0.2 mm.

The degree of irregularity of the sheet surface may be expressed by a surface roughness Sa (arithmetic mean height). The lower limit of the surface roughness of the Surface A is preferably 60 μm or more, 61 μm or more, 62 μm or more, 63 μm or more, or 64 μm or more; more preferably 65 μm or more, 66 μm or more, 67 μm or more, 68 μm or more, or 69 μm or more; and still more preferably 70 μm or more, 71 μm or more, 72 μm or more, 73 μm or more, 74 μm or more, 75 μm or more, 76 μm or more, 77 μm or more, 78 μm or more, or 79 μm or more, 80 μm or more, 81 μm or more, 82 μm or more, 83 μm or more, 84 μm or more, 85 μm or more, 86 μm or more, 87 μm or more, 88 μm or more, 89 μm or more, or 90 μm or more. This allows the powders that fall off from the sheet surface to be captured, and thereby suppressing the powder fall-off.

The upper limit of the surface roughness of the Surface A is preferably 250 μm or less, 249 μm or less, 248 μm or less, 247 μm or less, 246 μm or less, 245 μm or less, 244 μm or less, 243 μm or less, 242 μm or less, 241 μm or less, 240 μm or less, 239 μm or less, 238 μm or less, 237 μm or less, 236 μm or less, 235 μm or less, 234 μm or less, 233 μm or less, 232 μm or less, 231 μm or less, 230 μm or less, 229 μm or less, 228 μm or less, 227 μm or less, 226 μm or less, 225 μm or less, 224 μm or less, 223 μm or less, 222 μm or less, 221 μm or less, 220 μm or less, 219 μm or less, 218 μm or less, 217 μm or less, 216 μm or less, 215 μm or less, 214 μm or less, 213 μm or less, 212 μm or less, 211 μm or less, 210 μm or less, 209 μm or less, 208 μm or less, 207 μm or less, 206 μm or less, 205 μm or less, 204 μm or less, 203 μm or less, 202 μm or less, 201 μm or less, 200 μm or less, 199 μm or less, 198 μm or less, 197 μm or less, 196 μm or less, 195 μm or less, 194 μm or less, 193 μm or less, 192 μm or less, 191 μm or less, 190 μm or less, 189 μm or less, 188 μm or less, 187 μm or less, 186 μm or less, 185 μm or less, 184 μm or less, 183 μm or less, 182 μm or less, 181 μm or less, 180 μm or less, 179 μm or less, 178 μm or less, 177 μm or less, 176 μm or less, 175 μm or less, 174 μm or less, 173 μm or less, 172 μm or less, 171 μm or less, 170 μm or less, 169 μm or less, 168 μm or less, 167 μm or less, 166 μm or less, 165 μm or less, 164 μm or less, 163 μm or less, 162 μm or less, 161 μm or less, 160 μm or less, 159 μm or less, 158 μm or less, 157 μm or less, 156 μm or less, 155 μm or less, 154 μm or less, 153 μm or less, 152 μm or less, 151 μm or less, 150 μm or less, 149 μm or less, 148 μm or less, 147 μm or less, 146 μm or less, 145 μm or less, 144 μm or less, 143 μm or less, 142 μm or less, 141 μm or less, 140 μm or less, 139 μm or less, 138 μm or less, 137 μm or less, 136 μm or less, 135 μm or less, 134 μm or less, 133 μm or less, 132 μm or less, 131 μm or less, 130 μm or less, 129 μm or less, 128 μm or less, 127 μm or less, 126 μm or less, 125 μm or less, 124 μm or less, 123 μm or less, 122 μm or less, or 121 μm or less; more preferably 120 μm or less, 119 μm or less, 118 μm or less, 117 μm or less, 116 μm or less, 115 μm or less, 114 μm or less, 113 μm or less, 112 μm or less, or 111 μm or less; and still more preferably 110 μm or less, 109 μm or less, 108 μm or less, 107 μm or less, 106 μm or less, 105 μm or less, 104 μm or less, 103 μm or less, 102 μm or less, or 101 μm or less, or 100 μm or less. This prevents the holes themselves from falling off from the surface of the sheet, thereby suppressing the powder fall-off. Therefore, the surface roughness of the Surface A is preferably in the range of 60 to 250 μm, 60 to 240 μm, 60 to 230 μm, 60 to 220 μm, 60 to 210 μm, 60 to 200 μm, 60 to 190 μm, 60 to 180 μm, 60 to 170 μm, 60 to 160 μm, 60 to 150 μm, 60 to 140 μm, 60 to 130 μm, 61 to 130 μm, 61 to 129 μm, 61 to 128 μm, 61 to 127 μm, 61 to 126 μm, 62 to 125 μm, 62 to 124 μm, 62 to 123 μm, 62 to 122 μm, 62 to 121 μm, 63 to 120 μm, 63 to 119 μm, 63 to 118 μm, 63 to 117 μm, 63 to 116 μm, 64 to 115 μm, 64 to 114 μm, 64 to 113 μm, 64 to 112 μm, or 64 to 111 μm; more preferably in the range of 65 to 110 μm, 66 to 109 μm, 66 to 108 μm, 66 to 107 μm, 67 to 106 μm, 67 to 105 μm, 68 to 104 μm, 68 to 103 μm, 69 to 102 μm, or 69 to 101 μm; and still more preferably 70 to 250 μm, 70 to 240 μm, 70 to 230 μm, 70 to 220 μm, 70 to 210 μm, 70 to 200 μm, 70 to 190 μm, 70 to 180 μm, 70 to 170 μm, 70 to 160 μm, 70 to 150 μm, 70 to 140 μm, 70 to 130 μm, 70 to 120 μm, 70 to 110 μm, 70 to 100 μm, 71 to 100 μm, 72 to 100 μm, 73 to 100 μm, 74 to 100 μm, 75 to 100 μm, 76 to 100 μm, 77 to 100 μm, 78 to 100 μm, 79 to 100 μm, 80 to 100 μm, 81 to 100 μm, 82 to 100 μm, 83 to 100 μm, 84 to 100 μm, 85 to 100 μm, 86 to 100 μm, 87 to 100 μm, 88 to 100 μm, 89 to 100 μm, or 90 to 100 μm.

The lower limit of the surface roughness of the Surface B is preferably 20 μm or more, 21 μm or more, 22 μm or more, 23 μm or more, 24 μm or more, or 25 μm or more; more preferably 30 μm or more, 31 μm or more, 32 μm or more, 33 μm or more, 34 μm or more, 35 μm or more, 36 μm or more, 37 μm or more, 38 μm or more, or 39 μm or more; and still more preferably 40 μm or more. This allows the powders that fall off from the sheet surface to be captured, and thereby suppressing the powder fall-off. The upper limit of the surface roughness of the Surface B is preferably 180 μm or less, 170 μm or less, 160 μm or less, 150 μm or less, 140 μm or less, 130 μm or less, 120 μm or less, 110 μm or less, 100 μm or less, 90 μm or less, 80 μm or less, 70 μm or less, 60 μm or less, less than 60 μm, 59 μm or less, 58 μm or less, 57 μm or less, or 56 μm or less, more preferably 55 μm or less, and even more preferably 50 μm or less. This prevents the holes themselves from falling off from the surface of the sheet, thereby suppressing the powder fall-off. Therefore, the surface roughness of the Surface B is preferably in the range of 20 to 180 μm, 20 to 170 μm, 20 to 160 μm, 20 to 150 μm, 20 to 140 μm, 20 to 130 μm, 20 to 120 μm, 20 to 110 μm, 20 to 100 μm, 20 to 90 μm, 20 to 80 μm, 20 to 70 μm, 20 to less than 60 μm, 21 to less than 60 μm, 22 to less than 60 μm, 23 to less than 60 μm, 24 to less than 60 μm, 25 to less than 60 μm, 26 to less than 60 μm, 27 to less than 60 μm, 28 to less than 60 μm, or 29 to less than 60 μm; more preferably in the range of 30 to 180 μm, 30 to 170 μm, 30 to 160 μm, 30 to 150 μm, 30 to 140 μm, 30 to 130 μm, 30 to 120 μm, 30 to 110 μm, 30 to 100 μm, 30 to 90 μm, 30 to 80 μm, 30 to 70 μm, 30 to less than 60 μm, 30 to 59 μm, 30 to 58 μm, 30 to 57 μm, 30 to 56 μm, 30 to 55 μm, 30 to 54 μm, 30 to 53 μm, 30 to 52 μm, or 30 to 51 μm; and still more preferably in the range of 30 to 50 μm, 31 to 50 μm, 32 to 50 μm, 33 to 50 μm, 34 to 50 μm, 35 to 50 μm, 36 to 50 μm, 37 to 50 μm, 38 to 50 μm, 39 to 50 μm, 40 to 50 μm, 40 to 49 μm, 40 to 48 μm, 40 to 47 μm, 40 to 46 μm, or 40 to 45 μm.

The surface roughness of the Surface A is preferably more than that of the Surface B. The difference between the two (A-B) is usually 10 μm or more, 11 μm or more, 12 μm or more, 13 μm or more, 14 μm or more, 15 μm or more, 16 μm or more, 17 μm or more, 18 μm or more, or 19 μm or more; preferably 20 μm or more, 21 μm or more, 22 μm or more, 23 μm or more, 24 μm or more, 25 μm or more, 26 μm or more, 27 μm or more, 28 μm or more, or 29 μm or more; and more preferably 30 μm or more, 31 μm or more, 32 μm or more, 33 μm or more, 34 μm or more, 35 μm or more, 36 μm or more, 37 μm or more, 38 μm or more, 39 μm or more, or 40 μm or more. The upper limit thereof may be, for example, 100 μm or less, 99 μm or less, 98 μm or less, 97 μm or less, 96 μm or less, 95 μm or less, 94 μm or less, 93 μm or less, 92 μm or less, 91 μm or less, 90 μm or less, 89 μm or less, 88 μm or less, 87 μm or less, 86 μm or less, 85 μm or less, 84 μm or less, 83 μm or less, 82 μm or less, 81 μm or less, or 80 μm or less.

The ratio of the surface roughness of the Surface A to that of the Surface B (A/B) is preferably 1.3 or more, or 1.4 or more; more preferably 1.5 or more, 1.6 or more, 1.7 or more, 1.8 or more, 1.9 or more, 2.0 or more, 2.1 or more, or 2.2 or more; and still more preferably 2.3 or more, 2.4 or more, 2.5 or more, 2.6 or more, 2.7 or more, 2.8 or more, 2.9 or more, 3.0 or more, 3.1 or more, 3.2 or more, 3.3 or more, 3.4 or more, 3.5 or more, 3.6 or more, 3.7 or more, 3.8 or more, 3.9 or more, 4.0 or more, 4.1 or more, 4.2 or more, 4.3 or more, 4.4 or more, or 4.5 or more. The upper limit thereof is usually 7.0 or less, 6.9 or less, 6.8 or less, 6.7 or less, or 6.6 or less, preferably 6.5 or less, 6.4 or less, 6.3 or less, 6.2 or less, or 6.1 or less, and more preferably 6.0 or less. Thus, the ratio is preferably 1.3 or more, more preferably in the range of 1.3 to 7.0, 1.3 to 6.9, 1.3 to 6.8, 1.3 to 6.7, 1.3 to 6.6, 1.3 to 6.5, 1.3 to 6.0, 1.4 to 7.0, 1.4 to 6.9, 1.4 to 6.8, 1.4 to 6.7, 1.4 to 6.6, 1.5 to 7.0, 1.5 to 6.9, 1.5 to 6.8, 1.5 to 6.7, 1.5 to 6.6, 1.5 to 6.5, 1.5 to 6.4, 1.5 to 6.3, 1.5 to 6.2, 1.5 to 6.1, 1.5 to 6.0, 1.6 to 6.0, 1.7 to 6.0, 1.8 to 6.0, 1.9 to 6.0, 2.0 to 6.0, 2.1 to 6.0, 2.2 to 6.0, 2.3 to 7.0, 2.3 to 6.9, 2.3 to 6.8, 2.3 to 6.7, 2.3 to 6.6, 2.3 to 6.5, 2.3 to 6.4, 2.3 to 6.3, 2.3 to 6.2, 2.3 to 6.1, 2.3 to 6.0, 2.4 to 6.0, 2.5 to 6.0, 2.6 to 6.0, 2.7 to 7.0, 2.7 to 6.9, 2.7 to 6.8, 2.7 to 6.7, 2.7 to 6.6, 2.7 to 6.5, 2.7 to 6.4, 2.7 to 6.3, 2.7 to 6.2, 2.7 to 6.1, 2.7 to 6.0, 2.8 to 6.0, 2.9 to 6.0, 3.0 to 6.0, 3.1 to 6.0, 3.2 to 6.0, 3.3 to 6.0, 3.4 to 6.0, 3.5 to 6.0, 3.6 to 6.0, 3.7 to 6.0, 3.8 to 6.0, 3.9 to 6.0, 4.0 to 6.0, 4.1 to 6.0, 4.2 to 6.0, 4.3 to 6.0, 4.4 to 6.0, 4.5 to 7.0, 4.5 to 6.9, 4.5 to 6.8, 4.5 to 6.7, 4.5 to 6.6, 4.5 to 6.5, 4.5 to 6.4, 4.5 to 6.3, 4.5 to 6.2, 4.5 to 6.1, or 4.5 to 6.0.

The surface roughness Sa is the arithmetic mean height, which is the average of the values measured at five arbitrary locations in accordance with ISO 25178. The surface roughness Sa of the Surfaces A and B may be measured by observation using a microscope (for example, "One-Shot 3D Shape Measurement Instrument VR-6000", manufactured by Keyence Corp.). A 15 cm×15 cm measuring sheet is prepared, and under the state with the sheet surface flattened by placing a 0.13-kg weight on both ends at 3-cm intervals when viewed from the front direction, an image is taken with 12-magnification in the central area (18 mm×24 mm); and the value calculated from this image by an analysis program (program name: KEYENCE VR-6000 Analysis Application) under the surface roughness mode may be taken as the surface roughness Sa.

As described above, by controlling the surface characteristics of each of the two surfaces when viewed from a horizontal direction, such as the number (distribution) of holes, the shape-related characteristic such as a surface roughness, and a ratio of the holes on each of the two surfaces, within predetermined ranges, one surface (surface A) with a relatively higher number (distribution) of holes or a relatively higher surface roughness and the other surface (surface B) with a relatively lower number (distribution) of holes or a relatively lower surface roughness are formed.

By controlling the surface characteristics of the thermal insulation sheet, the thermal insulation performance thereof can be maintained at a high level. The reason is presumed as follows.

As a result, in the one surface (surface A), it is recognized that even if the silica aerogel physically and chemically bonded to the fibers is detached upon a stress, a vibration, or other force is applied to the sheet, because the number (distribution) of the hole is large or the surface roughness is relatively large, it is easy to capture the detached silica aerogel, thereby suppressing the powder fall-off to the down.

On the other surface (surface B), a stress, a vibration, or other force applied to the silica aerogel sheet is small, so that the silica aerogel physically and chemically bonded to the fiber is difficult to be detached; because of this, it was able to be recognized that the number (distribution) of the hole, which itself is the cause of the powder fall-off, can be reduced, or the surface roughness can be relatively lowered.

This makes it possible to suppress the powder fall-off in the sheet as a whole, thereby enabling to suppress the decrease in the thermal insulation performance. In addition, when the one surface (surface A) having a relatively large number (distribution) of the hole or a relatively large surface roughness has a predetermined shape and/or it is formed by fibers, it is possible to enhance the adhesiveness with a film or the like; and thus, when a stress, a vibration, or other force is applied to the silica aerogel sheet, the detachment of the silica aerogel from the film or the like may be suppressed, and as a result, the downward powder fall-off can be suppressed.

3. Method for Producing Thermal Insulation Sheet

For example, the thermal insulation sheet may be produced by dissolving a silica material in a solvent to prepare a reaction solution (sol), then gelatinizing it, removing impurities such as a solvent and unreacted materials from the resulting wet gel, and then coating and drying it in a frame.

Illustrative examples of the silica material include methyl trimethoxy silane (MTMS), trimethyl methoxy silane (TMS), dimethyl dimethoxy silane (DMS), trimethyl ethoxy silane, dimethyl diethoxy silane (DMDS), methyl triethoxy silane (MTES), ethyl triethoxy silane (ETES), diethyl diethoxy silane, ethyl triethoxy silane, propyl trimethoxy silane, propyl triethoxy silane, phenyl trimethoxy silane, phenyl triethoxy silane (PhTES), hexamethyl disilazane, and hexaethyl disilazane.

Illustrative examples of the solvent include water, methanol, ethanol, isopropanol, ethyl acetate, ethyl acetoacetate, acetone, dichloromethane, and tetrahydrofuran. Among these, an aqueous acidic solution is preferable; an aqueous acetic acid solution is more preferable. The reaction solution usually contains a hydrolyzable compound (for example urea) and, as needed, may contain a surfactant (such as an aliphatic ammonium and an alkylbenzylammonium). Upon preparing a sol, ice cooling and agitation may be carried out as needed.

Drying is carried out using usually a supercritical drying, but drying under an atmospheric pressure may also be used. Supercritical drying is the drying method in which a solvent (for example, an alcohol such as 2-propanol or ethanol) is replaced by a supercritical fluid (for example, a supercritical carbon dioxide gas) in one or two or more iterations. During drying, pressure may be applied as needed. By so doing, the sheet thickness may be made uniform.

The timing of the fiber addition is preferably at the stage from preparation of the reaction solution to gelatinization (for example, impregnating the nonwoven fabric of the fiber once or twice or more times in the reaction solution) and/or during drying. The impregnation in the reaction solution (sol) is more preferable.

The method of gelatinization is not particularly restricted. This may be performed, for example, by statically leaving the reaction solution (for example, statically leaving in a closed apparatus, preferably in a closed apparatus under heating (for example, 50° C. or higher or 60° C. or higher) and statically), with adding a catalyst, irradiating UV light, or the like. Leaving statically is preferable. The hole ratio of the sheet surfaces and the surface roughness may also be controlled by the conditions in gelatinization or the fiber addition (number of the impregnation repetitions).

In this specification, the silica aerogel includes not only the silica aerogel in the narrow sense (silica aerogel obtained by supercritical drying), but also the silica aerogels obtained by other drying methods (for example, xerogel (produced by drying under normal pressure), cryogel (produced by freeze-drying), and ambigel (produced by drying under ambient pressure)).

At any stage in the production process, the formation of hole is performed, for example, by perforation or the like. With this, the hole ratio of the sheet surfaces and the surface roughness may be controlled.

Hydrophobization treatment (for example, conversion of the silica surface functional group (for example, hydroxyl group) to a hydrophobic trimethylsilyl group) may be performed at any stage, preferably before the drying step. The hydrophobization treatment may be performed by adding a hydrophobic agent such as a trimethylsilylating agent. When the hydrophobic treatment is performed, the content of hydrophobic silica in the total aerosilicagel sheet obtained by this treatment is preferably 58 by mass or more, more preferably 78 by mass or more, and the upper limit thereof is preferably 30% by mass or less, more preferably 25% by mass or less. The weight ratio of the hydrophobic silica to the unhydrophobic silica (hydrophobic/unhydrophobic) is preferably 0.1 or more, more preferably 0.2 or more, and the upper limit thereof is preferably 1.5 or less, more preferably 1.2 or less, and still more preferably 1.0 or less.

4. Other Layers

The thermal insulation sheet may constitute a laminate (thermal insulation material) together with other members. Other members include a film, an elastic body layer, an adhesive layer, and the like.

4.1 Film

The thermal insulation material may further have a film that covers (seals) at least one of the surfaces (preferably only the Surface A, or both the Surfaces A and B). By so doing, the powder fall-off may be suppressed more. In particular, it is preferable to cover the Surface A or both the Surfaces. By so doing, the powder fall-off may be suppressed more efficiently. This effect may be further enhanced by placing the sheet surface A on the side that receives a greater stress, a vibration, or other force and the sheet surface B on the side that receives a shorter stress, a vibration, or other force, between the cells.

Illustrative examples of the material for the polymer film include polyimide, polycarbonate, PET, p-phenylene sulfide, polyetherimide, crosslinked polyethylene, chloroprene rubber flame retardant, polyvinylidene fluoride, rigid polyvinyl chloride, polybutylene terephthalate, PTFE, PFA, FEP, ETFE, flame retardant PET, polystyrene, polyether sulfone, polyamide imide, polyacrylonitrile, polyethylene, polypropylene, and polyamide.

4.2 Adhesive Layer

When the thermal insulation material is going to be provided with other member, it may further include an adhesive layer. The adhesive layer may be composed of a material that is possible to adhere the thermal insulation sheet with the other member. Illustrative examples of the material for the adhesive layer include an epoxy resin, a phenol resin, an acrylic resin, a melamine resin, a vinyl acetate resin, a silicone resin, a urethane resin, polyethylene, and polypropylene.

4.3 Elastic Body Layer

The elastic body layer is the layer to relieve a stress that is generated in the thermal insulation sheet and to give a certain compressive load to the battery cell. In particular, by covering the Surface A, the stress relaxation effect may be more enhanced. This effect may be enhanced furthermore when the Surface A that is covered with the elastic body layer is placed on the side that receives a greater stress between the cells. The material for the elastic body layer may be any of a natural rubber and a synthetic rubber. Illustrative examples thereof include polyisoprene, hydrogenated polyisoprene, polybutadiene, styrene-butadiene copolymer, isobutylene-isoprene copolymer, ethylene-propylene copolymer, ethylene-propylene-diene ternary copolymer (EPDM), and silicone, as the main component therein. The shape of the elastic body is not particularly restricted, nor is the shape of the surface thereof; but it is preferable that the one surface not in contact with the thermal insulation sheet (for example, the surface in contact with the cell) has a protruding portion such as burns and dents. This allows the stress in the sheet to be relaxed, thereby further enhancing the preventive effect of the powder fall-off.

4.4 Lamination Method

The method of laminating other layer to the sheet is not particularly restricted; thus, any method with which the lamination with other layer required for the thermal insulation sheet is performed may be used. The lamination may be performed with the method in which an adhesive is applied to at least one surface of the thermal insulation sheet (using equipment and tools such as a blade coater, a bar coater, a die coater, a comma coater (registered trademark), a roll coater, or a brush, as needed) and then dried (for example, at 80 to 180° C. for several minutes to several tens of minutes), and with the method in which the other layer that has been prepared in advance is bonded by an adhesive or via an adhesive layer, among other methods. In the case of the film, for example, the film is attached to the sheet surface with an adhesive or the like, or put into a bag-shaped film.

5. Uses of the Thermal Insulation Sheet

In the thermal insulation sheet, the thermal insulation property is well balanced in both surfaces. Therefore, this can be used as the thermal insulation sheet between battery cells for an automobile. When used between the automobile battery cells, the sheet may be placed between the cells for use.

It is preferable to place the Surface A of the sheet in the side where a stress is generated by expansion of the battery, the side where the vibration is generated, the side where the motor vibration is larger, or the like, in other words, in the side that receives a larger stress. This allows the powder fall-off to be effectively suppressed and adhesiveness to be maintained. On the other hand, the side of the Surface B is allowed to maintain the thermal insulation performance as well as the adhesiveness. As a result, it is possible to express the thermal insulation performance as a whole.

Examples

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

[Preparation Method of Glass Fiber-Reinforced Aerogel Sheet]

—Preparation of Glass Fiber-Reinforced Aerogel Sheet (1)—

After 1.00 g of cetyl trimethyl ammonium bromide (also known as hexadecyl trimethyl ammonium bromide, manufactured by Nacalai Tesque, Inc.; hereinafter this is abbreviated as "CTAB") as a cationic surfactant was dissolved in 10.00 g of 0.01 mol/L acetic acid solution as an acidic solution, 0.50 g of urea (manufactured by Nacalai Tesque, Inc.) as a hydrolyzable compound was added to be dissolved. To the acidic aqueous solution thereby obtained, 5.0 mL of methyl trimethoxy silane (LS-530 (specific gravity of 0.95), hereinafter this is abbreviated as "MTMS"; manufactured by Shin-Etsu Chemical Co., Ltd.) was added as the silica material; then, the resulting mixture was stirred and mixed with ice-cooling for 30 minutes to hydrolyze MTMS to obtain a sol. The resulting sol was then impregnated into a perforated glass fiber nonwoven fabric (Nitigura Mat, MNA-300-1000-30m, thickness of 3 mm; manufactured by Nihon Glass Fiber Industrial Co., Ltd.) placed on a polypropylene film (thickness of 50 μm). This was allowed to statically leave in a sealed container at 60° C. for 3 hours for gelatinization. The gel was then allowed to mature by statically leaving in the sealed container for 96 hours. The product was taken out from the sealed container and immersed in 2-propanol to displace the solvent. This operation was performed at 60° C. for 24 hours in the first time, and at 60° C. for 48 hours in the second time after replacing with a new 2-propanol.

The aerogel sheet was then supercritically dried under the following conditions.

After completion of the solvent displacement, the resulting aerogel sheet was put into a 400-mL autoclave filled with 2-propanol. After the autoclave was closed with a lid, the first liquid phase displacement was performed while keeping

16 the pressure at about 882 N/cm² (about 90 kgf/cm²) and feeding a liquefied carbon dioxide gas (time required: 1.5 hours).

After completion of the first liquid phase displacement, the liquefied carbon dioxide gas was allowed to diffuse into the gel for 17.5 hours while keeping the pressure with the valve closed.

The second liquid phase displacement was then performed in the same manner as the first displacement, while keeping the pressure at about 882 N/cm² (about 90 kgf/cm²) (time required: 1 hour).

After completion of the second liquid phase displacement, the liquefied carbon dioxide gas was allowed to diffuse into the gel for 5 hours while keeping the pressure with the valve closed, in the similar manner as in the first case.

Then, the third liquid phase displacement was performed in the same manner as the first displacement, while keeping the pressure at about 882 N/cm² (about 90 kgf/cm²) (time required: 0.75 hours).

After the third liquid phase displacement, the valve was closed and the autoclave was warmed up from room temperature to 80° C. over 1.5 hours.

After reached 80° C., the pressure was reduced at a rate of 4.9 N/cm²·min (0.5 kgf/cm²·min).

After the atmospheric pressure was reached, the autoclave was allowed to be cooled to room temperature for over 2 hours.

The autoclave was then opened and the aerogel sheet was removed to complete the supercritical drying.

As a result, the glass fiber-reinforced aerogel sheet (1) (thickness: 3 mm) was obtained.

The side in contact with the film is the Surface B.

—Preparation of Glass Fiber-Reinforced Aerogel Sheet (2)—

The glass fiber-reinforced aerogel sheet (2) was prepared in the same way as in the preparation method of sheet (1), except that the generated sol was heated at 60° C. for 0.5 hours and then statically left in the sealed container at 60° C. for 2.5 hours with the glass fiber nonwoven fabric impregnated so as to conduct the gelatinization.

—Preparation of Glass Fiber-Reinforced Aerogel Sheet (3)—

The glass fiber-reinforced aerogel sheet (3) was prepared in the same way as in the preparation method of sheet (1), except that the generated sol was heated at 60° C. for 1 hour and then statically left in the sealed container at 60° C. for 2 hours with the glass fiber unwoven fabric impregnated so as to conduct the gelatinization.

—Preparation of Glass Fiber-Reinforced Aerogel Sheet (4)—

The glass fiber-reinforced aerogel sheet (4) was prepared in the same way as in the preparation method of sheet (2), except that the sol-impregnated nonwoven fabric was interposed between polypropylene films, squeegeed from the side of the Surface A, and then the polypropylene film on the side of the Surface A was removed.

—Preparation of Glass Fiber-Reinforced Aerogel Sheet (5)—

The glass fiber-reinforced aerogel sheet (5) was prepared in the same way as in the preparation method of sheet (2), except that the glass fiber nonwoven fabric was perforated from the side of the Surface B.

—Preparation of Glass Fiber-Reinforced Aerogel Sheet (6)—

The glass fiber-reinforced aerogel sheet (6) was prepared in the same way as in the preparation method of sheet (1), except that the sol-impregnated nonwoven fabric was statically left in the sealed container at 60° C. for 1 hour, and then removed from the sealed container and impregnated with the sol again.

—Preparation of Glass Fiber-Reinforced Aerogel Sheet (7)—

The glass fiber-reinforced aerogel sheet (7) was prepared in the same way as in the preparation method of sheet (6), except that the nonwoven fabric having the Surface A fluffed was used.

—Preparation of Glass Fiber-Reinforced Aerogel Sheet (8)—

The glass fiber-reinforced aerogel sheet (8) was prepared in the same way as in the preparation method of sheet (1), except that the sol-impregnated nonwoven fabric was interposed between polypropylene films, squeegeed from the side of the Surface A, and then the polypropylene film on the side of the Surface A was removed.

—Preparation of Glass Fiber-Reinforced Aerogel Sheet (9)—

The glass fiber-reinforced aerogel sheet (9) was prepared in the same way as in the preparation method of sheet (8), except that the nonwoven fabric having the Surface B fluffed was used.

—Preparation of Glass Fiber-Reinforced Aerogel Sheet (10)—

The glass fiber-reinforced aerogel sheet (10) was prepared in the same way as in the preparation method of sheet (5), except that the sol-impregnated nonwoven fabric was statically left in the sealed container at 60° C. for 1 hour, then removed from the sealed container and impregnated with the sol again.

—Preparation of Glass Fiber-Reinforced Aerogel Sheet (11)—

The glass fiber-reinforced aerogel sheet (11) was prepared in the same way as in the preparation method of sheet (1), except that the generated sol was heated at 60° C. for about 0.1 hours and then statically left in the sealed container at 60° C. for about 2.9 hours with the glass fiber nonwoven fabric impregnated so as to conduct the gelatinization.

—Preparation of Glass Fiber-Reinforced Aerogel Sheet (12)—

The glass fiber-reinforced aerogel sheet (12) was prepared in the same way as in the preparation method of sheet (1), except that the generated sol was heated at 60° C. for about 0.7 hours and then statically left in the sealed container at 60° C. for about 2.3 hours with the glass fiber nonwoven fabric impregnated so as to conduct the gelatinization.

—Preparation of Glass Fiber-Reinforced Aerogel Sheets (13) and (14)—

The glass fiber-reinforced aerogel sheets (13) and (14) were prepared in the same way as in the preparation method of sheet (4), except that the glass fiber nonwoven fabric was perforated from the side of the Surface B.

—Preparation of Glass Fiber-Reinforced Aerogel Sheet (15)—

The glass fiber-reinforced aerogel sheet (15) was prepared in the same way as in the preparation method of sheet (1), except that the generated sol was heated at 60° C. for 2 hours, impregnated to the glass fiber nonwoven fabric, and statically left to gelatinize in the sealed container at 60° C. for 1 hour.

—Preparation of Glass Fiber-Reinforced Aerogel Sheet (16)—

The glass fiber-reinforced aerogel (16) was prepared in the same way as the preparation method of sheet (1), except that the generated sol was impregnated into the glass fiber nonwoven fabric (MC-600A; chopped strand mat, 1-mm thick, manufactured by Nitto Boseki Co., Ltd.) having the side of the Surfaces A and B fluffed so as to be stacked to give a thickness of 3 mm, and then, this was statically left at 60° C. for 3 hours for gelatinization.

—Preparation of Glass Fiber-Reinforced Aerogel Sheet (17)—

The glass fiber-reinforced aerogel sheet (17) was prepared in the same way as in the preparation method of sheet (4), except that the generated sol was impregnated into the glass fiber nonwoven fabric (MC-600A; chopped strand mat, 1-mm thick, manufactured by Nitto Boseki Co., Ltd.) so as to be stacked to give a thickness of 3 mm, and then, this was interposed between polypropylene films; then, after this was squeegeed from the side of the Surface A, the film on the side of the Surface A was removed followed by impregnation with the sol, and this was interposed again between the polypropylene films.

—Preparation of Glass Fiber-Reinforced Aerogel Sheet (18)—

The glass fiber-reinforced aerogel sheet (18) was prepared in the same way as in the preparation method of sheet (15), except that the generated sol was fluffed on the side of the Surface A.

—Preparation of Glass Fiber-Reinforced Aerogel Sheet (19)—

The glass fiber-reinforced aerogel sheet (19) was prepared in the same way as in the preparation method of sheet (2), except that the generated sol was impregnated into the glass fiber nonwoven fabric (MC-600A; chopped strand mat, 1 mm thick, manufactured by Nitto Boseki Co., Ltd.) so as to be stacked to give a thickness of 3 mm.

—Preparation of Glass Fiber-Reinforced Aerogel Sheet (20)—

The glass fiber-reinforced aerogel sheet (20) was prepared in the same way as in the preparation method of sheet (2), except that the glass fiber nonwoven fabric (Nitigura Mat, MNA-800-1000-20m, thickness of 8 mm) was used.

—Preparation of Glass Fiber-Reinforced Aerogel Sheet (21)—

The glass fiber-reinforced aerogel sheet (21) was prepared in the same way as in the preparation method of sheet (3), except that the glass fiber nonwoven fabric (Nitigura Mat, MNA-800-1000-20m, thickness of 8 mm) was used.

—Preparation of Glass Fiber-Reinforced Aerogel Sheet (22)—

The glass fiber-reinforced aerogel sheet (22) was prepared in the same way as in the preparation method of sheet (20), except that the generated sol was fluffed on the side of the Surface A.

—Preparation of Glass Fiber-Reinforced Aerogel Sheet (23)—

The glass fiber-reinforced aerogel sheet (23) was prepared in the same way as in the preparation method of sheet (20), except that the generated sol was fluffed on the side of the Surface B.

Test Methods for Physical Properties

—Evaluation Method for "Powder Fall-Off"—

(1) A measurement sheet (5 cm×5 cm surface, prepared by cutting) covered with a PET film (thickness of 50 μm) and then adhered to a rubber sheet was prepared as the sample. The rubber sheet has a structure consisting of connected multiple protruding units (in cross section, 10.86-mm wide at the base and about 7-mm high, consisting of convex portions with a 60° taper which extends in the width direction and surrounding concave portions, having the width including the concave and convex portions of about 20.5 mm). The measurement sheet and the rubber sheet were disposed such that the concave portion of the protrusion was on the side of the Surface A. In a shaker equipped with a jig consisting of a pair of metal plates and a powder receiver, the sample was placed between the metal plates with its surface directed in a vertical direction (upright), pressurized and fixed so that the sample was compressed by 50%, and then, this was vibrated at 3G/15 Hz×800,000 times.

(2) The film was then peeled off while the sample is standing almost in a horizontal direction, and then the amounts of aerogel of the Surfaces A and B having fallen off each were visually checked. For evaluation of powder fall-off of sheets (1) to (19), each of the amounts of aerogel of the surface A of these sheets was compared with the surface A of sheet (15) and each of the amounts of aerogel of the surface B of these sheets was compared with the surface A of sheet (16) to determine which of the evaluation criteria (3) they met. For evaluation of powder fall-off of sheets (20) to (23), each of the amounts of aerogel of the surface A of these sheets was compared with the surface A of sheet (23) and each of the amounts of aerogel of the surface B of these sheets was compared with the surface A of sheet (23) to determine which of the evaluation criteria (3) they met.

(3) Evaluation standards (for sheets (1) to (19), the Surface A is evaluated based on the Surface A of sheet (15), the Surface B is evaluated based on the Surface B of sheet (16), respectively; for sheets (20) to (23), the Surface A is evaluated based on the Surface A of sheet (23), the Surface B is evaluated based on the Surface B of sheet (23), respectively.)

The fall-down amount of the aerogel is 1/3 or less relative to the standard: A.

The fall-down amount of the aerogel is more than 1/3 and 1/2 or less relative to the standard: B.

The fall-down amount of the aerogel is more than 1/2 relative to the standard: C.

The sheets (15), (16) and (23) are the basis, e.g., reference values, for evaluation of powder fall-off, and thus, the evaluation results of powder fall-off and comprehension evaluation results for these sheets are not described in the following tables.

—Method for Evaluating "Adhesiveness"—

The sample having the adhesive tapes (0.15-mm thick, green, manufactured by Sekisui Chemical Co., Ltd.) attached to the Surfaces A and B of the thermal insulation sheet was prepared. A 180° peel test (in accordance with JIS Z 0237:2009, a tensile rate of 300 mm/min) was performed at the interface between the thermal insulation sheet and the adhesive tape using a desktop tensile tester ("AGS-1 kNG", manufactured by Minebeba) to measure the peeling force, which was used as the adhesion force between the layers.

<Standard for Surface A>

Those with a tensile load of 5 N/25 mm or more were judged as "A" for good adhesion, those with a tensile load of 0.5 to 5 N/25 mm were judged as "B", and those with a tensile load of less than 0.5 N/25 mm were judged as "C" for poor adhesion.

<Standard for Surface B>

Those with a tensile load of 0.5 N/25 mm or more were judged as "A" for good adhesion, and those with a tensile load of less than 0.5 N/25 mm were judged as "C" for poor adhesion —Evaluation Method for "Comprehensive Evaluation"—

The comprehensive evaluation was based on the following standards.

When all are A: ++ (very good)

In the case of A and B: + (good)

In the case of at least one C: – (poor)

Test Methods for Sheet Surface Properties

—Surface Roughness—

The surface roughness Sa was measured by the following method. The sheet was cut to obtain a 15 cm×15 cm sheet. Under the state with the sheet surface flattened by placing a 0.13-kg weight on both ends at 3-cm intervals when viewed from the front direction, an image was taken at 12-magnification in the central area (18 mm×24 mm) of the measuring sheet surface using a microscope ("One-shot 3D Shape Measurement Instrument VR-6000"; manufactured by Keyence Corp.). The surface roughness was calculated from this image under the surface roughness mode in an analysis program (program name: KEYENCE VR-6000 Analysis Application) at arbitrarily 5 points, and the average value thereof was taken as the surface roughness Sa.

—Number of Holes Per Unit Area—

The number of holes was measured by the following method. The sheet was cut into a 15 cm×15 cm piece, and the sheet surface thereof was photographed at five arbitrary locations with a digital camera (PowerShot SX720 HS, manufactured by Canon Inc). The photographed image was cut out to obtain a 2 cm×2 cm image (200 pixels×200 pixels) using the image processing software (for example, ImageJ), and using the ImageJ's binarization function, the area with a luminance of 125 or less was binarized as the hole. Next, using the ImageJ's particle analysis function, particles with 4 pixels^2 or less were removed as noise, and the number of holes was counted at each of the 5 locations, and the average value thereof was calculated.

The hole may be covered with glass fibers or the like, or it may include the hole that penetrates from the surface to the back surface. The diameter of the hole counted under the above conditions is the hole greater than or equal to 0.2 mm.

TABLE 1

| | | Sample No. | | | | |
|---|---|---|---|---|---|---|
| | | 1 | 2 | 3 | 4 | 5 |
| Surface A | Number of holes | 80 holes (200000) | 40 holes (100000) | 20 holes (50000) | 40 holes (100000) | 40 holes (100000) |
| Surface B | Number of holes | 9 holes (22500) | 9 holes (22500) | 9 holes (22500) | 5 holes (12500) | 15 holes (37500) |
| Hole ratio | | 8.9 | 4.4 | 2.2 | 8 | 2.7 |

TABLE 2

| | | Sample No. | | | | |
|---|---|---|---|---|---|---|
| | | 6 | 7 | 8 | 9 | 10 |
| Surface A | Number of holes | 40 holes (100000) | 40 holes (100000) | 40 holes (100000) | 40 holes (100000) | 20 holes (50000) |
| Surface B | Number of holes | 9 holes (22500) | 9 holes (22500) | 9 holes (22500) | 9 holes (22500) | 15 holes (37500) |
| | Hole ratio | 4.4 | 4.4 | 4.0 | 4.0 | 1.3 |

TABLE 3

| | | Sample No. | | | |
|---|---|---|---|---|---|
| | | 11 | 12 | 13 | 14 |
| Surface A | Number of holes | 72 holes (180000) | 28 holes (70000) | 40 holes (100000) | 40 holes (100000) |
| Surface B | Number of holes | 9 holes (22500) | 9 holes (22500) | 5 holes (13000) | 14 holes (35000) |
| | Hole ratio | 8.0 | 3.1 | 8.0 | 2.9 |

TABLE 4

| | | Sample No. | | | | |
|---|---|---|---|---|---|---|
| | | 15 | 16 | 17 | 18 | 19 |
| Surface A | Number of holes | 10 holes (25000) | 0 holes (0) | 0 holes (0) | 10 holes (25000) | 0 holes (0) |
| Surface B | Number of holes | 9 holes (22500) | 0 holes (0) | 0 holes (0) | 9 holes (22500) | 0 holes (0) |
| | Hole ratio | 1.1 | — | — | 1.1 | — |

TABLE 5

| | | Sample No. | | | | | | | | | |
|---|---|---|---|---|---|---|---|---|---|---|---|
| | | 1 | 2 | 3 | 4 | 5 | 6 | 7 | 8 | 9 | 10 |
| Roughness (μm) | Surface A | 100 | 90 | 80 | 90 | 90 | 60 | 100 | 90 | 90 | 80 |
| | Surface B | 40 | 40 | 40 | 30 | 50 | 30 | 30 | 25 | 55 | 50 |
| Roughness ratio | | 2.5 | 2.3 | 2.0 | 3.0 | 1.8 | 2.0 | 3.3 | 4.5 | 1.5 | 1.6 |
| Roughness difference | | 60 | 50 | 40 | 60 | 40 | 30 | 70 | 65 | 35 | 30 |

TABLE 6

| | | Sample No. | | | | | | | | |
|---|---|---|---|---|---|---|---|---|---|---|
| | | 11 | 12 | 13 | 14 | 15 | 16 | 17 | 18 | 19 |
| Roughness (μm) | Surface A | 95 | 85 | 90 | 90 | 45 | 100 | 20 | 90 | 90 |
| | Surface B | 40 | 40 | 35 | 45 | 40 | 100 | 20 | 40 | 40 |
| Roughness ratio | | 2.4 | 2.1 | 2.6 | 2.0 | 1.1 | 1.0 | 1.0 | 4.4 | 4.4 |
| Roughness difference | | 45 | 45 | 55 | 45 | 5 | 0 | 0 | 50 | 50 |

23

TABLE 7

| | | Sample No. | | | |
|---|---|---|---|---|---|
| | | 20 | 21 | 22 | 23 |
| Roughness | Surface A | 180 | 130 | 250 | 180 |
| (μm) | Surface B | 100 | 100 | 100 | 180 |
| | Roughness ratio | 1.8 | 1.3 | 2.5 | 1.0 |
| | Roughness difference | 80 | 30 | 150 | 0 |

TABLE 8

| | | Sample No. | | | | | | | | | |
|---|---|---|---|---|---|---|---|---|---|---|---|
| | | 1 | 2 | 3 | 4 | 5 | 6 | 7 | 8 | 9 | 10 |
| Powder fall-off | Surface A | B | A | B | A | A | B | B | A | A | B |
| | Surface B | A | A | A | B | B | A | A | B | B | B |
| Adhesion strength | Surface A | A | A | B | A | A | B | A | A | A | B |
| | Surface B | A | A | A | A | A | A | A | A | A | A |
| Comprehensive evaluation | | + | ++ | + | + | + | + | + | + | + | + |

TABLE 9

| | | Sample No. | | | | | | | | |
|---|---|---|---|---|---|---|---|---|---|---|
| | | 11 | 12 | 13 | 14 | 15 | 16 | 17 | 18 | 19 |
| Powder fall-off | Surface A | A | A | A | A | | B | C | A | A |
| | Surface B | A | A | A | A | A | | B | A | A |
| Adhesion strength | Surface A | A | A | A | A | C | B | C | B | B |
| | Surface B | A | A | A | A | A | A | C | A | A |
| Comprehensive evaluation | | ++ | ++ | ++ | ++ | | | − | + | + |

TABLE 10

| | | Sample No. | | | |
|---|---|---|---|---|---|
| | | 20 | 21 | 22 | 23 |
| Powder fall-off | Surface A | A | A | B | – |
| | Surface B | A | A | A | – |
| Comprehensive evaluation | | ++ | ++ | + | |

Footnote in Tables

In the Tables, the number of holes is the number of holes observed in the area of 2 cm×2 cm (200 pixels×200 pixels); and also the number of holes per 1 m² is described (number in parentheses).

The comprehensive evaluation was + or ++ in all of the sheets (1) through (14) where the number of holes was 1.3 or more. The comprehensive evaluations for the sheet (18) and (19), where the differences in the surface roughness were more than 30, were +.

With regard to the number of holes on the surface A, it is considered as follows. Comparing the sheet (1) with the sheet (2), the powder fall-off of the Surface A was evaluated as B in the sheet (1), whereas it was evaluated as A in the sheet (2) where the number of holes on the Surface A was relatively small. Comparing the sheets (3) and (10) with the sheet (2), the powder fall-off was evaluated as B in the sheets (3) and (10), whereas it was evaluated as A in the sheet (2), which had a relatively large number of holes on the surface A. These results indicate that a smaller number of holes on the Surface A tends to suppress the fall-off of the holes themselves, while a larger number of holes tends to capture the powder more readily.

The number of holes on the Surface B is considered as follow. Comparing the sheet (4) with the sheet (2), the powder fall-off of the Surface B in the sheet (4) was evaluated as B, whereas in the sheet (2), where the number of holes on the Surface B was relatively large, it was evaluated as A. Comparing the sheets (5) and (10) with the sheet (2), the powder fall-off of the Surface B was evaluated as B in the sheets (5) and (10), whereas it was evaluated as A in the sheet (2), which had a relatively a large number of holes on the Surface B. These results indicate that for the Surface B, as with the Surface A, fewer holes tend to suppress the fall-off of the holes themselves, while more holes tend to capture the powder more readily.

The comprehensive evaluation was + or ++ in all of the sheets (1) to (14) and (18) to (22) where the ratio of the surface roughness Sa of the surface A to the surface roughness Sa of the surface B was 1.3 or more. The surface roughness on the Surface A is considered as follows. Comparing the sheet (6) with the sheet (2), the powder fall-off of the Surface A was evaluated as B in the sheet (6), whereas it was evaluated as A in the sheet (2) where the surface roughness on the Surface A was relatively large. Comparing the sheet (7) with the sheet (2), the powder fall-off was evaluated as B in the sheet (7), whereas it was evaluated as A in the sheet (2), where the surface roughness on the surface A was relatively small. Comparing the sheets (20) and (21) with the sheet (22), the powder fall-off was evaluated as B in the sheet (22), whereas it was evaluated as A in the sheets (20) and (21), where the surface roughness on the surface A was relatively small. These results indicate that a larger surface roughness on the Surface A tends to capture more powder by the holes, while a smaller surface roughness tends to suppress the fall-off of the holes themselves.

The surface roughness on the Surface B is considered as follows. Comparing the sheet (8) with the sheet (2), the powder fall-off of the Surface B was evaluated as B in the sheet (8), whereas it was evaluated as A in the sheet (2), where the surface roughness on the surface B was relatively large. Comparing the sheet (9) with the sheet (2), the powder fall-off was evaluated as B in the sheet (9), whereas it was evaluated as A in the sheet (2), where the surface roughness on the surface A was relatively small. These results indicate that similarly to the Surface A, a larger surface roughness on the Surface B tends to capture more powder by the holes, while a smaller surface roughness tends to suppress the fall-off of the holes themselves.

In the Examples described above, a specific embodiment has been described. However, these Examples are mere examples; thus, these must not be restrictively interpreted. Various variations apparent to those skilled in the art are contemplated to be within the scope of the embodiments.

The results described above indicate that the thermal insulation sheet according to the embodiments has excellent thermal insulation characteristics, and demonstrates that it can be useful as the thermal insulation material between the battery cells for an automobile.

According to the embodiments, it is possible to provide a thermal insulation sheet for electric automobile batteries that allows the powder fall-off to be prevented from occurring, thereby exhibiting excellent thermal insulation properties. In other words, according to the embodiments, responding to the stress difference between both surfaces, it is possible to prevent the powder fall-off from occurring, thereby allowing the thermal insulation performance of the sheet to be enhanced as a whole, and being able to make it useful as a thermal insulation sheet between battery cells for an electric automobile.

What is claimed is:

1. A thermal insulation sheet between battery cells for an electric automobile, the thermal insulation sheet comprising:
   silica aerogel; and
   a fiber, wherein
   the thermal insulation sheet has a plurality of holes on one surface and another surface in a thickness direction, and
   a ratio of a number of holes on the one surface to a number of holes on the other surface is 1.3 or more.

2. The sheet according to claim 1, wherein the number of holes on the one surface is in a range of 25,000 to 225,000 holes/m$^2$.

3. The sheet according to claim 1, wherein the number of holes on the other surface is in a range of 10,000 to 50,000 holes/m$^2$.

4. The sheet according to claim 1, wherein a difference between a surface roughness of the one surface and a surface roughness Sa of the other surface is 10 μm or more.

5. The sheet according to claim 1, wherein a difference between a surface roughness of the one surface and a surface roughness Sa of the other surface is 30 μm or more.

6. The sheet according to claim 1, wherein a surface roughness Sa of the one surface is 60 μm or more.

7. The sheet according to claim 1, wherein a surface roughness Sa of the one surface is in a range of 80 to 250 μm.

8. The sheet according to claim 1, wherein a surface roughness Sa of the other surface is 180 μm or less.

9. The sheet according to claim 1, wherein a surface roughness Sa of the other surface is in a range of 30 to 180 μm.

10. The sheet according to claim 1, further comprising a film that covers at least part of the one surface and the other surface.

11. The sheet according to claim 1, further comprising an elastic body layer that is laminated to at least part of the one surface and at least part of the other surface.

12. The sheet according to claim 1, further comprising:
   a film that covers the one surface and the other surface; and
   an elastic body layer that is laminated to the one surface or to the other surface via the film.

13. A thermal insulation sheet between battery cells for an electric automobile, the thermal insulation sheet comprising:
   silica aerogel; and
   a fiber, wherein
   the thermal insulation sheet has a plurality of irregularities on one surface and another surface in a thickness direction, and
   a ratio of a surface roughness Sa of the one surface to a surface roughness Sa of the other surface is 1.3 or more.

14. The sheet according to claim 1, wherein:
   the number of holes on the one surface is in a range of 100,000 to 150,000 holes/m$^2$,
   a surface roughness Sa of the one surface is in a range of 80 to 100 μm,
   the number of holes on the other surface is in a range of 20,000 to 30,000 holes/m$^2$, and
   a surface roughness Sa of the other surface is in a range of 30 to 50 μm.

15. The sheet according to claim 13, wherein:
   the ratio of the number of holes on the one surface to the number of holes on the other surface is in a range of 2.3 to 4.4, and
   a difference between the surface roughness of the one surface and the surface roughness Sa of the other surface is in a range of 30 to 100 μm.

* * * * *